(12) United States Patent
Hamon et al.

(10) Patent No.: US 8,444,944 B2
(45) Date of Patent: May 21, 2013

(54) METHOD OF DECOMPOSING $N_2O$ USING A CATALYST BASED ON A CERIUM LANTHANUM OXIDE

(75) Inventors: Christian Hamon, Saint-nazaire (FR); Emmanuel Rohart, Sainte Soulle (FR)

(73) Assignees: Rhodia Operations, Aubervilliers (FR); Institut Regional des Materiaux Avances, Ploemeur (FR)

( * ) Notice: Subject to any disclaimer, the term of this patent is extended or adjusted under 35 U.S.C. 154(b) by 0 days.

(21) Appl. No.: 13/122,424

(22) PCT Filed: Sep. 28, 2009

(86) PCT No.: PCT/EP2009/062490
§ 371 (c)(1),
(2), (4) Date: Jun. 6, 2011

(87) PCT Pub. No.: WO2010/037696
PCT Pub. Date: Apr. 8, 2010

(65) Prior Publication Data
US 2011/0243829 A1    Oct. 6, 2011

(30) Foreign Application Priority Data
Oct. 3, 2008  (FR) ...................................... 08 05481

(51) Int. Cl.
*C01B 21/02*  (2006.01)
*C01B 21/38*  (2006.01)
*C07C 55/14*  (2006.01)

(52) U.S. Cl.
USPC ................. 423/239.1; 423/393; 562/590

(58) Field of Classification Search
USPC ................ 423/239.1, 393; 562/590
See application file for complete search history.

(56) References Cited

U.S. PATENT DOCUMENTS

| 6,228,799 | B1 | 5/2001 | Aubert et al. | |
|---|---|---|---|---|
| 7,767,175 | B2 * | 8/2010 | Golden et al. | 423/213.2 |
| 2004/0228785 | A1 | 11/2004 | Duclos et al. | |
| 2009/0041645 | A1 | 2/2009 | Wassermann et al. | |
| 2009/0191108 | A1 * | 7/2009 | Blanchard et al. | 423/239.1 |

FOREIGN PATENT DOCUMENTS

| DE | 102007038711 A1 | 2/2009 |
|---|---|---|
| EP | 0789621 B1 | 5/1999 |
| EP | 1504805 A1 | 8/2003 |
| FR | 2748740 A1 | 11/1997 |
| FR | 2847830 A1 | 4/2004 |

OTHER PUBLICATIONS

International Search Report corresponding to PCT/EP 2009/062490, Nov. 23, 2009.

* cited by examiner

*Primary Examiner* — Timothy Vanoy
(74) *Attorney, Agent, or Firm* — Dentons US LLP

(57) ABSTRACT

A method for decomposing $N_2O$ is described. The method uses, as a catalyst, an oxide based on cerium and lanthanum, which further includes at least one oxide of an element chosen from zirconium and rare earths other than cerium and lanthanum. This catalyst is stable, enabling it to be used at high temperatures.

24 Claims, No Drawings

METHOD OF DECOMPOSING $N_2O$ USING A CATALYST BASED ON A CERIUM LANTHANUM OXIDE

This application claims priority under 35 U.S.C. §119 of FR 0805481, filed Oct. 3, 2008, and is the United States national phase of PCT/EP2009/062490, filed Sep. 28, 2009, and designating the United States (published in the French language on Apr. 8, 2010, as WO 2010/037696 A1; the title and abstract were also published in English), each hereby expressly incorporated by reference in its entirety and each assigned to the assignee hereof.

The present invention relates to a process for the decomposition of $N_2O$ in which use is made of a catalyst based on an oxide of cerium and of lanthanum.

It is known that $N_2O$ is one of the gases participating in the greenhouse effect, an effect which it is increasingly desired to reduce in the context of combating global warming.

In point of fact, $N_2O$ occurs in a large amount in the gases emitted by some industrial plants, such as those for the manufacture of nitric acid or adipic acid. In order to avoid discharges of $N_2O$, these gases are treated so as to decompose the $N_2O$ to give oxygen and nitrogen, before being discharged to the atmosphere. In order to be effective, this treatment requires the use of catalysts.

There already exist catalysts for this type of treatment, for example compositions based on magnesium or calcium oxides, on oxides of nickel and of cobalt or on oxides of copper and of zinc, or compositions based on oxides of cerium and of cobalt or on oxides of cerium and of zirconium.

The problem with the known catalysts is that they exhibit an inadequate stability over time.

The object of the invention is to provide a catalyst for the decomposition of $N_2O$ which exhibits an improved stability.

With this aim, the process of the invention for the decomposition of $N_2O$ is characterized in that use is made, as catalyst, of an oxide based on cerium and on lanthanum which additionally comprises at least one oxide of an element chosen from zirconium and rare earth metals other than cerium and lanthanum.

The catalysts of the invention exhibit an improved stability, even at temperatures of greater than 1000° C.

Other characteristics, details and advantages of the invention will become even more fully apparent on reading the description which will follow and the various concrete but nonlimiting examples intended to illustrate it.

The term "rare earth metal" is understood to mean, for the continuation of the description, the elements of the group consisting of yttrium and the elements of the Periodic Table with an atomic number between 57 and 71 inclusive.

The term "specific surface" is understood to mean the BET specific surface determined by nitrogen adsorption in accordance with the standard ASTM D 3663-78 drawn up from the Brunauer-Emmett-Teller method described in the periodical, The Journal of the American Chemical Society, 60, 309 (1938).

The contents are given as weight of oxide, unless otherwise indicated. In the catalyst of the invention, the cerium oxide is in the form of ceric oxide and the oxides of the other rare earth metals are in the form $Ln_2O_3$, Ln denoting the rare earth metal, with the exception of praseodymium, expressed in the form $Pr_6O_{11}$.

It is also specified, for the continuation of the description, that, unless otherwise indicated, in all the ranges or limits of values which are given, the values at the limits are included, the ranges or limits of values thus defined therefore covering any value at least equal to or greater than the lower limit and/or at most equal to or lower than the upper limit. In addition, the calcinations on conclusion of which the specific surface values are given are calcinations under air, unless otherwise indicated.

According to a specific embodiment of the invention, the catalyst used is an oxide based on cerium, on lanthanum and on zirconium and it additionally comprises at least one oxide of an element chosen from rare earth metals other than cerium and lanthanum.

In both embodiments which have been described above, the rare earth metal other than cerium and lanthanum can be praseodymium, neodymium, gadolinium or yttrium.

The total proportion of lanthanum element and optionally rare earth metal other than cerium and lanthanum is generally at most 15% by weight of oxide of this or of these elements (lanthanum+other rare earth metal), with respect to the total weight of the catalyst. This proportion can more particularly be at most 10%. The minimum amount of lanthanum and optionally of other rare earth metal is generally at least 3% by weight of oxide. In the particular case where the catalyst comprises lanthanum with at least one other rare earth metal, the lanthanum content is preferably at least 2% and at most 10%. All the values mentioned above are given by way of indication and without implied limitation. The minimum values are those below which the catalyst might not exhibit a satisfactory stability. The maximum values are those beyond which the activity of the catalyst might be inadequate or else they correspond to economic limits.

In the case of a catalyst based on zirconium, the proportion of zirconium is preferably at most 40% by weight of zirconium oxide, with respect to the total weight of the catalyst. This proportion can more particularly be at most 35%.

Furthermore, the catalyst of the invention can additionally comprise at least one other element chosen from cobalt, iron, copper and zinc. This other element is generally present in the catalyst in the form of an oxide. The proportion of this or these other elements is generally at most 15% by weight of oxide of this element, with respect to the total weight of the catalyst. The minimum amount of this element, when it is present in the catalyst of the invention, is preferably at least 1%.

It should be noted that the invention applies to the case where the catalyst is composed essentially of an oxide based on cerium, on lanthanum and on one or more other elements which have been mentioned above, that is to say zirconium, rare earth metals other than cerium and lanthanum, cobalt, iron, copper and zinc. In particular, the catalyst can be composed essentially of an oxide based on cerium, on lanthanum and on one or more rare earth metals other than cerium and lanthanum, with optionally another element chosen from cobalt, iron, copper and zinc. The term "is composed essentially" is understood to mean that the catalyst under consideration comprises only the oxides of the abovementioned elements and that it does not comprise an oxide of another functional element, that is to say an element capable of having a positive influence on the stability of the catalyst. On the other hand, the catalyst can comprise elements, such as impurities, which can in particular originate from its process of preparation, for example from the starting materials or starting reactants used.

According to another advantageous embodiment of the invention, the catalyst is provided in the form of a solid solution. Within the meaning of the present description, the term "be provided in the form of a solid solution" is understood to mean the fact that the catalyst, after calcination under air, in the presence of water (15% by volume), at a temperature of 1050° C. and for 48 h, exhibits a crystallographic structure of solid solution type. In this case, the diffractograms obtained by X-ray diffraction on the catalyst after calcination under the abovementioned conditions reveal, within the catalyst, only the existence of a single crystallographic phase. It is generally a clearly identifiable phase of cubic crystal symmetry of fluorine type, thus reflecting the existence of a pure solid solution of the lanthanum, of the zirconium and of the other optional rare earth metal in the cerium oxide.

In the case of this same embodiment and for the catalysts comprising another element chosen from cobalt, iron, copper and zinc, this element is preferably found in the form finely divided in the catalyst, generally at the surface of the latter, so that the presence of an oxide of this element does not appear in the X-ray analysis.

In the case of this embodiment, the catalysts in the form of a solid solution exhibit an improved catalytic activity.

It is preferable to use, as catalyst, oxides exhibiting a high specific surface at high temperature. Thus, the catalyst can advantageously exhibit a specific surface of at least 20 $m^2/g$ after calcination under air at 900° C. for 6 h. In the particular case of catalysts comprising zirconium oxide, this specific surface, under the same conditions of temperature and duration, is preferably at least 25 $m^2/g$ and more preferably at least 35 $m^2/g$.

The oxides capable of being used as catalyst for the present invention are known. Use may be made, for example, of those described in patent application EP-0 906 244-A1. They are compositions based on oxides of cerium, of zirconium and of another rare earth metal.

Use may be made, for the compositions based on oxides of cerium, of lanthanum and optionally of another rare earth metal, of the products described in EP-0 444 470-A1, which can exhibit, at 900° C., specific surfaces suitable for the present invention.

A description will now more particularly be given of a composition based on oxides of cerium, of lanthanum and optionally of another rare earth metal which exhibits an even higher specific surface at high temperature and which may be very particularly suitable in the context of the present invention.

This specific or particular composition is of the type composed essentially of cerium oxide, of lanthanum oxide and of at least one oxide of another rare earth metal and it is characterized in that it exhibits a specific surface of at least 20 $m^2/g$ after calcination at 1000° C. for 5 h.

The term "is composed essentially" is understood to mean, here again, that the composition under consideration comprises only the oxides of the abovementioned elements, cerium and other rare earth metals, and that it does not comprise an oxide of another element capable of having a positive influence on the stability of the specific surface of the composition. On the other hand, the composition can comprise elements, such as impurities, which may in particular originate from its process of preparation, for example from the starting materials or starting reactants used.

This particular composition can additionally exhibit a specific surface of at least 22 $m^2/g$, after calcination at 1000° C. for 5 h. More generally, values of at least approximately 25 $m^2/g$ can be obtained under the same calcination conditions.

The specific surface of this same composition can still remain high even at a still higher temperature. Thus, this specific surface can be at least 10 $m^2/g$, more particularly at least 14 $m^2/g$, after calcination at 1100° C. for 5 h.

This same composition can also be characterized by its porosity. This is because it exhibits, even at high temperature, porosities which are high and which are contributed by pores having a size of at most 200 nm. In other words, the composition exhibits a high mesoporosity.

The porosities indicated in the present description are measured by mercury intrusion porosimetry in accordance with the standard ASTM D 4284-03 (Standard method for determining pore volume distribution of catalysts by mercury intrusion porosimetry).

More specifically, the composition exhibits, after calcination at 1000° C. over 5 h, a porosity, contributed by pores with a diameter of at most 200 nm, which is at least 0.15 $cm^3/g$, more particularly at least 0.2 $cm^3/g$. In addition, this same composition can exhibit, after calcination at 1000° C. for 5 h, a porosity of at least 0.10 $cm^3/g$, more particularly of at least 0.15 $cm^3/g$, this porosity being contributed by pores with a diameter of at most 50 nm.

It should also be noted that this specific composition exhibits substantially identical porosities after calcination at 900° C. for 5 h. In other words, the porosity of the composition virtually does not vary after calcination at 900° C. and then at 1000° C. for 5 h. This applies very particularly to the porosity contributed by the pores of at most 200 nm. This is because, in this case, the reduction in the porosity is generally at most 10%, preferably at most 5%.

The process for the preparation of this specific composition will now be described.

This process is characterized in that it comprises the following stages:
- a liquid medium comprising a cerium compound is formed;
- the medium is heated at a temperature of at least 100° C.;
- the precipitate obtained on conclusion of the preceding stage is separated from the liquid medium, compounds of the other rare earth metals (lanthanum and the rare earth metal other than lanthanum and cerium) are added thereto and another liquid medium is formed;
- the medium thus obtained is heated at a temperature of at least 100° C.;
- the reaction medium obtained on conclusion of the preceding heating operation is brought to a basic pH;
- the precipitate resulting from the preceding stage is separated and calcined.

The first stage of the process thus consists in forming a liquid medium comprising a cerium compound.

The liquid medium is generally water.

The cerium compound is preferably chosen from soluble compounds. This can in particular be an organic or inorganic acid salt, such as a nitrate, a sulfate, an acetate, a chloride or a ceric ammonium nitrate.

Preferably, ceric nitrate is used. It is advantageous to use salts with a purity of at least 99.5% and more particularly of at least 99.9%. An aqueous ceric nitrate solution can, for example, be obtained by reaction of nitric acid with a ceric oxide hydrate prepared conventionally by reaction of a solution of a cerous salt, for example cerous nitrate, and of an ammonia solution in the presence of aqueous hydrogen peroxide solution. Use may also preferably be made of a ceric nitrate solution obtained according to the process for electrolytic oxidation of a cerous nitrate solution as described in the document FR-A-2 570 087, which constitutes an advantageous starting material here.

It should be noted here that the aqueous solutions of cerium salts may exhibit a degree of initial free acidity which can be adjusted by the addition of a base or of an acid. However, it is just as possible to employ an initial solution of cerium salts actually exhibiting a degree of free acidity as mentioned above as solutions which have been neutralized beforehand in a more or less exhaustive fashion. This neutralization can be carried out by addition of a basic compound to the abovementioned mixture, so as to limit this acidity. This basic compound can, for example, be an ammonia solution or a solution of alkali metal (sodium, potassium, and the like) hydroxides but is preferably an ammonia solution.

Finally, it should be noted that, when the starting mixture comprises cerium essentially in the III form, it is preferable to involve, in the course of the process, an oxidizing agent, for example aqueous hydrogen peroxide solution.

It is also possible to use a sol as starting cerium compound. The term "sol" denotes any system composed of fine solid particles of colloidal dimensions, that is to say dimensions of between approximately 1 nm and approximately 500 nm, based on a cerium compound, this compound generally being a cerium oxide and/or a cerium oxide hydrate, in suspension in an aqueous liquid phase, it being possible for said particles in addition to optionally comprise residual amounts of bonded or adsorbed ions, such as, for example, nitrates, acetates, chlorides or ammoniums. It should be noted that, in such a sol, the cerium can occur either completely in the form of colloids or simultaneously in the form of ions and in the form of colloids.

The mixture can be obtained without distinction either from compounds initially in the solid state which will subsequently be introduced into a vessel heel of water, for example, or directly from solutions of these compounds.

The second stage of the process consists in heating the medium prepared in the preceding stage at a temperature of at least 100° C.

The temperature at which the medium is heated is generally between 100° C. and 150° C., more particularly between 110° C. and 130° C. The heating operation can be carried out by introducing the liquid medium into a closed chamber (closed reactor of the autoclave type). Under the temperature conditions given above and in an aqueous medium, it may thus be specified, by way of illustration, that the pressure in the closed reactor can vary between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). It is also possible to carry out the heating in an open reactor for temperatures in the vicinity of 100° C.

The heating can be carried out either under air or under an inert gas atmosphere, preferably nitrogen.

The duration of the heating can vary within wide limits, for example between 30 minutes and 48 h, preferably between 1 and 5 h. Likewise, the rise in temperature takes place at a rate which is not critical and it is thus possible to reach the set reaction temperature by heating the medium for, for example, between 30 minutes and 4 h, these values being given entirely by way of indication.

A precipitate is obtained on conclusion of the heating operation, which precipitate is separated from the liquid medium by any suitable means, for example by withdrawing the aqueous mother liquors. Compounds of the other rare earth metals (lanthanum and the rare earth metal other than lanthanum and cerium) are added to the precipitate thus separated, forming a second liquid medium.

These rare earth metal compounds can be of the same nature as the cerium compound used in the first stage of the process. That which was described above for this compound thus applies here to these rare earth metal compounds, which can more particularly be chosen from the nitrates, sulfates, acetates or chlorides.

In another stage of the process, the second liquid medium is heated at a temperature of at least 100° C.

Here again, that which was described above for the first heating operation likewise applies here for the second heating operation.

On conclusion of this second heating operation, the reaction medium obtained is brought to a basic pH. For this, a basic compound is introduced into the reaction medium. Use may be made, as base or basic compound, of the products of the hydroxide type. Mention may be made of alkali metal or alkaline earth metal hydroxides. Use may also be made of secondary, tertiary or quaternary amines. However, amines and ammonia may be preferred insofar as they reduce the risks of pollution by the alkali metal or alkaline earth metal cations. Mention may also be made of urea. The basic compound can more particularly be used in the form of a solution.

The value of the pH to which the medium is brought can more particularly be between 8 and 10, more particularly between 8 and 9.

In a final stage of the process, the precipitate recovered is subsequently calcined. This calcination makes it possible to develop the crystallinity of the product formed and it can also be adjusted and/or chosen as a function of the subsequent operating temperature intended for the composition, this being done while taking into account the fact that the specific surface of the product decreases as the calcination temperature employed increases. Such a calcination is generally carried out under air but a calcination carried out, for example, under an inert gas or under a controlled atmosphere (oxidizing or reducing) is very clearly not ruled out.

In practice, the calcination temperature is generally limited to a range of values between 300° C. and 1000° C.

On returning now, on conclusion of the description of the above particular composition, to the more general description of the invention, it should be noted that, for the catalysts comprising another element chosen from cobalt, iron, copper and zinc, these can be obtained from the mixed oxides described above by incorporating said element therein by any known surface-deposition technique, such as in particular dry impregnation or wet impregnation.

The oxide has to have been shaped in order to be able to be used as catalyst in the application of the invention.

It can thus be provided, for example, in the extruded or bead form. The oxide thus shaped can additionally comprise a binder. This binder is chosen from those which are normally used in extrusion techniques, such as, for example, silica, alumina, boehmite, clays, silicates, aluminosilicates, titanium sulfate or ceramic fibers. These binders are present in the proportions generally used, that is to say up to approximately 30% by weight, more particularly of at most approximately 20% by weight.

The catalyst can also be in the form of a coating based on the oxide of the invention on a ceramic or metal substrate.

In view of its stability, the catalyst of the invention can be used within a wide temperature range and in particular at high temperatures, in particular of greater than 1000° C.

The process for the decomposition of $N_2O$ of the invention can be employed very particularly in a process for the preparation of nitric acid or adipic acid.

In the particular case of a process for the preparation of nitric acid, the catalyst can in particular be used by being placed under the platinum gauzes of the reactor for the oxidation of ammonia.

Examples will now be given.

The characteristics of the catalysts which are used in the examples which follow are given in table 1 below.

The catalyst C0 is a comparative catalyst and the catalysts C1 to C4 are catalysts according to the invention.

The catalysts C1 to C3 were prepared according to the teaching of EP-0 906 244-A1 and by impregnation of the oxides obtained with a cobalt solution. The catalyst C4 was prepared in the following way.

201.6 ml of a ceric nitrate solution comprising at least 90 mol % of cerium(IV) ions and comprising 50 g of $CeO_2$ are neutralized with 5.7 ml of a 25% aqueous ammonia solution and then diluted with 792.7 ml of pure water. This solution is subsequently heated at 100° C. for 0.5 h. After removing the aqueous mother liquors, 6.1 ml of a lanthanum nitrate solution comprising 2.63 g of $La_2O_3$ and 5.3 ml of a praseodymium nitrate solution comprising 2.63 g of $Pr_6O_{11}$ are added to the medium. Pure water is added in order to bring the total volume of the solution to 1 liter. The procedure subsequently followed is as in example 1, in order to obtain a composition comprising 5% by weight of $La_2O_3$, 5% by weight of $Pr_6O_{11}$ and 90% by weight of $CeO_2$.

The oxide obtained was impregnated with a cobalt solution.

The heat treatment was carried out under an air+water (15%) mixture at the temperature indicated and for the time indicated.

TABLE 1

| Reference | Composition (% by weight of oxides) | Crystallographic structure after heat treatment | |
|---|---|---|---|
| | | 950° C. 6 hours | 1050° C. 48 hours |
| C0 | $CeO_2/ZrO_2$ (58/42) | SS | MP |
| C1 | $CeO_2/ZrO_2/La_2O_3/Pr_6O_{11}$ (60/30/3/7) | SS | SS |
| C2 | 95% $CeO_2/ZrO_2/La_2O_3/Pr_6O_{11}$ (60/30/3/7) + 5% $Co_3O_4$ | SS | SS |
| C3 | 90% $CeO_2/ZrO_2/La_2O_3/Pr_6O_{11}$ (60/30/3/7) + 10% $Co_3O_4$ | SS | SS |
| C4 | 90% $CeO_2/La_2O_3/Pr_6O_{11}$ (90/5/5) + 10% $Co_3O_4$ | SS | SS |

MP: mixture of phases
SS: solid solution

EXAMPLE 1

This example illustrates the $N_2O$ conversions obtained over the various catalysts after a heat treatment at 950° C. under the conditions given above.

The catalysts are tested in the form of granules, the grain size of which is between 0.5 mm and 1 mm. For each test, the weight of catalyst is 10.5 g (i.e., a volume of granules of 10 ml) and the hourly space velocity is 70 000 $h^{-1}$.

The conditions of the test carried out in the laboratory are as follows:

The gas mixture treated comprises 15% by volume of $H_2O$ and 1000 ppm of $N_2O$, the remainder being air. The content of water vapor is adjusted by a stainless steel air humidifier in temperature (60° C.).

The $N_2O$ is analyzed by infrared at the reactor outlet. The $N_2O$ conversion is measured at a constant temperature equal to 850° C.

The results obtained are given in table 2 below.

TABLE 2

| Catalyst | $N_2O$ conversion (%) |
|---|---|
| C0 (comparative) | 87 |
| C1 | 95 |
| C2 | 98 |
| C3 | 100 |

A marked difference is recorded between the degrees of conversion of the catalysts according to the invention (at least 956 conversion of $N_2O$) and that of the comparative catalyst (only 87% conversion) under the same experimental conditions.

EXAMPLE 2

This example illustrates the $N_2O$ conversions obtained over the various catalysts after heat treatments at 1050° C. under the conditions given above.

The shaping of the catalysts and the experimental conditions of their use are identical to those described above in example 1.

The results obtained are given in table 3 below.

TABLE 3

| Catalyst | $N_2O$ conversion (%) |
|---|---|
| | 1050° C. |
| C0 (comparative) | 77 |
| C1 | 91 |

Table 3 shows that the catalyst according to the invention allows, after heat treatment at 1050° C., better $N_2O$ conversion than the comparative catalyst. In addition, its fall in activity is markedly less than that of the comparative catalyst.

EXAMPLE 3

This example illustrates the $N_2O$ conversions obtained over catalysts after a heat treatment at 850° C. under an air+water (15% by volume) mixture for 1 month.

The shaping of the catalysts and the experimental conditions of their use are identical to those described above in example 1.

The results obtained are given in table 4 below.

TABLE 4

| Catalyst | $N_2O$ conversion (%) |
|---|---|
| C0 (comparative) | 94 |
| C3 | 98 |
| C4 | 99 |

What is claimed is:
1. A process for the decomposition of $N_2O$, the process comprising using a catalyst comprising an oxide based on cerium, on lanthanum and on zirconium which additionally comprises at least one oxide of an element chosen from a rare earth metal other than cerium and lanthanum.

2. A process for the decomposition of $N_2O$, the process comprising using a catalyst comprising an oxide based on cerium, on lanthanum and a rare earth metal, where the rare earth metal is praseodymium, neodymium, gadolinium or yttrium.

3. A process for the decomposition of $N_2O$, the process comprising using a catalyst comprising an oxide based on cerium and on lanthanum which additionally comprises at least one oxide of an element chosen from zirconium and a rare earth metal other than cerium and lanthanum, wherein the catalyst is provided in the form of a solid solution, after calcination under air, in the presence of water, at a temperature of 1050° C. and for 48 h.

4. The process as claimed in claim 3, wherein a total proportion of the lanthanum and the rare earth metal, other than cerium and lanthanum, is at most 15% by weight of oxide of this or of these elements, with respect to the total weight of the catalyst.

5. A process for the decomposition of $N_2O$, the process comprising using a catalyst comprising an oxide based on cerium and on lanthanum which additionally comprises zirconium oxide and which, after calcination under air, in the presence of water, at a temperature of 1050° C. and for 48 h, is provided in the form of a solid solution.

6. The process as claimed in claim 5, wherein the oxide is a zirconium oxide and the proportion of the zirconium is at most 40% by weight of the zirconium oxide, with respect to the total weight of the catalyst.

7. The process as claimed in claim 5, wherein the catalyst further comprises at least one other element chosen from cobalt, iron, copper or zinc.

8. The process as claimed in claim 7, wherein the other element is at most 15% by weight of the oxide of this element, with respect to the total weight of the catalyst.

9. The process as claimed in claim 7, wherein the total proportion of lanthanum and, when present, the rare earth metal other than cerium and lanthanum is at most 15% by weight of oxide of these elements (lanthanum+other rare earth metal), with respect to the total weight of the catalyst.

10. The process as claimed in claim 7, the process comprising using a catalyst in which the proportion of the other element chosen from cobalt, iron, copper and zinc is at most 15% by weight of oxide of this element, with respect to the total weight of the catalyst.

11. The process as claimed in claim 5, wherein the process is used to prepare nitric acid or adipic acid.

12. The process as claimed in claim 5 wherein the catalyst additionally comprises at least one oxide of an element chosen from rare earth metals other than cerium and lanthanum.

13. The process as claimed in claim 12, wherein the at least one oxide of a element chosen from rare earth metals is praseodymium, neodymium, gadolinium or yttrium.

14. A process for the decomposition of $N_2O$, the process comprising using a catalyst which consists essentially of a cerium oxide, of a lanthanum oxide and of an oxide of one or more rare earth metals other than cerium and lanthanum.

15. The process as claimed in claim 14, wherein the catalyst, after calcination under air, in the presence of water, at a temperature of 1050° C. and for 48 h, is provided in the form of a solid solution.

16. The process as claimed in claim 14, wherein the catalyst exhibits a specific surface of at least 20 $m^2/g$ after calcination at 1000° C. for 5 h.

17. The process as claimed in claim 16, wherein the catalyst exhibits, after calcination at 1000° C. over 5 h, a porosity contributed by pores with a diameter of at most 200 nm which is at least 0.15 $cm^3/g$.

18. The process as claimed in claim 16, wherein the catalyst exhibits, after calcination at 1000° C. over 5 h, a porosity contributed by pores with a diameter of at most 200 nm which is at least 0.2 $cm^3/g$.

19. The process as claimed in claim 14, wherein the at least one oxide of a element chosen from rare earth metals is praseodymium, neodymium, gadolinium or yttrium.

20. The process as claimed in claim 14, wherein the total proportion of lanthanum and, when present, the rare earth metal other than cerium and lanthanum is at most 15% by weight of oxide of these elements (lanthanum+other rare earth metal), with respect to the total weight of the catalyst.

21. A process for the decomposition of $N_2O$, the process comprising using a catalyst which consists essentially of a cerium oxide, a lanthanum oxide, an oxide of one or more rare earth metals other than cerium and of at least one other element chosen from cobalt, iron, copper and zinc.

22. The process as claimed in claim 21, wherein the catalyst, after calcination under air, in the presence of water, at a temperature of 1050° C. and for 48 h, is provided in the form of a solid solution.

23. The process as claimed in claim 21, the process comprising using a catalyst in which the proportion of the other element chosen from cobalt, iron, copper and zinc is at most 15% by weight of oxide of this element, with respect to the total weight of the catalyst.

24. The process as claimed in claim 21, wherein the total proportion of lanthanum and, when present, the rare earth metal other than cerium and lanthanum is at most 15% by weight of oxide of these elements (lanthanum+other rare earth metal), with respect to the total weight of the catalyst.

* * * * *